United States Patent
Edwardson et al.

(10) Patent No.: US 7,567,992 B1
(45) Date of Patent: Jul. 28, 2009

(54) REPLICATING OF PLURALITY OF INSTANCES OF AN OBJECT MODEL IN MEMORY ARRANGEMENT USING PORTABLE OBJECT REFERENCES WHERE EACH OBJECT ATTRIBUTE ASSIGNED GUID

(75) Inventors: David J. Edwardson, Shoreview, MN (US); Charles J. Griep, St. Anthony, MN (US); Brian A. Wegleitner, Andover, MN (US); David E. Wilhelm, Woodbury, MN (US)

(73) Assignee: Unisys Corporation, Blue Bell, PA (US)

( * ) Notice: Subject to any disclaimer, the term of this patent is extended or adjusted under 35 U.S.C. 154(b) by 286 days.

(21) Appl. No.: 11/647,862

(22) Filed: Dec. 29, 2006

(51) Int. Cl.
G06F 17/30 (2006.01)
G06F 17/00 (2006.01)
G06F 9/44 (2006.01)

(52) U.S. Cl. .................. 707/203; 707/100; 707/103 R; 707/103 Y; 707/206; 717/165; 711/147

(58) Field of Classification Search .................. 707/1, 707/100, 102, 103 R–104.1, 103 Y, 203, 206; 717/104, 108, 116, 153, 165; 709/203, 220–224; 711/147–149, 168–169
See application file for complete search history.

(56) References Cited

U.S. PATENT DOCUMENTS

| 5,615,362 | A | * | 3/1997 | Jensen et al. | 707/103 R |
| 5,634,124 | A | * | 5/1997 | Khoyi et al. | 707/103 R |
| 5,732,282 | A | * | 3/1998 | Provino et al. | 719/324 |
| 5,918,229 | A | * | 6/1999 | Davis et al. | 707/10 |
| 6,112,024 | A | * | 8/2000 | Almond et al. | 717/122 |
| 6,182,286 | B1 | * | 1/2001 | Sigal et al. | 717/122 |
| 6,185,578 | B1 | * | 2/2001 | Yokote et al. | 707/203 |
| 6,199,082 | B1 | * | 3/2001 | Ferrel et al. | 715/205 |

(Continued)

FOREIGN PATENT DOCUMENTS

EP 0647902 A1 * 4/1995

(Continued)

OTHER PUBLICATIONS

Dejan Milojicic, et al. "Global Memory Management for a Multi Computer System", no date, 12 pages.*

(Continued)

*Primary Examiner*—Srirama Channavajjala
(74) *Attorney, Agent, or Firm*—Richard J. Gregson; Robert P. Marley

(57) ABSTRACT

Various approaches for managing a plurality of instances of an object model are disclosed. At least a first and a second instance of the object model are established in first and second data processing systems. Each instance includes a plurality of objects, and each object includes a first attribute that is a globally unique identifier (GUID). Objects are associated other objects of the plurality of objects, and for each association between a first and a second one of the plurality of objects, the first object includes a second attribute that is the GUID of the second object. Established in each system are first and second versions of a data set that includes the GUIDs of the plurality of objects and associated pointers to memory locations of the objects in the first and second memory arrangements.

17 Claims, 4 Drawing Sheets

U.S. PATENT DOCUMENTS

| | | | |
|---|---|---|---|
| 6,457,011 B1 * | 9/2002 | Brace et al. | 707/10 |
| 7,389,335 B2 * | 6/2008 | MacLeod et al. | 709/223 |
| 7,430,744 B2 * | 9/2008 | Straube et al. | 719/313 |
| 2002/0103819 A1 * | 8/2002 | Duvillier et al. | 707/206 |
| 2005/0119871 A1 * | 6/2005 | Deffler | 703/22 |
| 2008/0040656 A1 * | 2/2008 | Lammel et al. | 715/230 |

FOREIGN PATENT DOCUMENTS

| | | | |
|---|---|---|---|
| WO | WO 9532463 | * | 11/1995 |
| WO | WO9919802 | * | 4/1999 |
| WO | WO 03/096186 | * | 11/2003 |

OTHER PUBLICATIONS

Bryan Hunt, et al. "Multiprocessor Memory Management: Integrating Four-Address Virtual Memory and Aliased Page Tables", IEEE 1996, pp. 262-267.*

* cited by examiner

US 7,567,992 B1

REPLICATING OF PLURALITY OF INSTANCES OF AN OBJECT MODEL IN MEMORY ARRANGEMENT USING PORTABLE OBJECT REFERENCES WHERE EACH OBJECT ATTRIBUTE ASSIGNED GUID

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to distributing an object oriented data model.

BACKGROUND

There are some systems in which an object oriented data model ("object model") is replicated across multiple computing platforms. An example system is for monitoring and controlling the operations of multiple data processing systems such as the Operations Sentinel software system from Unisys. The Operations Sentinel system allows multiple operators at multiple workstations to monitor and control the operating state of one or more data processing systems and associated peripheral hardware and network hardware. The underlying data model is object oriented and the monitored components are related in a graph.

In the example system, monitored components are represented with icons that are displayed to the operator, and connections between components are represented as lines that connect the components. The icons and lines may be color coded to indicate the operational status. In order to provide an accurate view to multiple operators, the object model is replicated across the multiple workstations. An event reporting mechanism may be used to change the value of an attribute of a monitored component, and the operators at the workstations may be notified of the change. Other types of changes to the object model may be more complicated.

For example, in one scenario components may be added to or removed from the object model, or the connections between the components may be changed. The implementation of the objects and interrelationships in the data model may complicate the replication of this type of change across the multiple instances of the object model. Some object relationships may be implemented as pointers to memory location in which the "related" or "associated" objects are stored. Since pointer values will vary from one instance of the object model to another, in order to propagate a change to the object model the entire model may need to be copied from one system to another in order to maintain the integrity of the pointer values. In addition, special methods maybe required for saving and loading the object model based on the object types and references to other objects.

A method and system that address these and other related issues are therefore desirable.

SUMMARY

The various embodiments of the invention provide methods and systems for managing a plurality of instances of an object model. In one embodiment, a method establishes at least a first and a second instance of the object model in first and second memory arrangements of first and second data processing systems, respectively. Each instance includes a plurality of objects, wherein each object includes a first attribute that is a globally unique identifier (GUID), a plurality of objects are associated other objects of the plurality of objects, and for each association between a first and a second one of the plurality of objects, the first object includes a second attribute that is the GUID of the second object. In each respective memory arrangement are established, first and second versions of a data set that includes the GUIDs of the plurality of objects and associated pointers to memory locations of the objects in the first and second memory arrangements. A first version of a third object of the plurality of objects is stored in a first memory location in the first memory arrangement. In response to input of a second version of the third object, establishing the second version of the third object at a second memory location in the first memory arrangement that is different from the first location, and updating in the first version of the data set, the pointer associated with the third object to reference the second location.

In another embodiment, an apparatus is provided for managing a plurality of instances of an object model. The apparatus comprises: means for establishing at least a first and a second instance of the object model in first and second memory arrangements of first and second data processing systems, respectively, each instance including a plurality of objects, wherein each object includes a first attribute that is a globally unique identifier (GUID), a plurality of objects are associated other objects of the plurality of objects, and for each association between a first and a second one of the plurality of objects, the first object includes a second attribute that is the GUID of the second object; means for establishing in each respective memory arrangement, first and second versions of a data set that includes the GUIDs of the plurality of objects and associated pointers to memory locations of the objects in the first and second memory arrangements; wherein a first version of a third object of the plurality of objects is stored in a first memory location in the first memory arrangement; and means, responsive to input of a second version of the third object, for establishing the second version of the third object at a second memory location in the first memory arrangement that is different from the first location, and updating in the first version of the data set, the pointer associated with the third object to reference the second location.

Another embodiment provides a system for managing an object model. The system includes a plurality of data processing systems coupled via a network. Each system has a stored instance of the object model, including at least a first and a second instance of the object model in first and second memory arrangements of first and second data processing systems, respectively. Each instance includes a plurality of objects, each object includes a first attribute that is a globally unique identifier (GUID), a plurality of objects are associated other objects of the plurality of objects, and for each association between a first and a second one of the plurality of objects, the first object includes a second attribute that is the GUID of the second object. The first and second instances of the object model further include first and second versions of a data set that includes the GUIDs of the plurality of objects and associated pointers to memory locations of the objects in the first and second memory arrangements, and a first version of a third object of the plurality of objects is stored in a first memory location in the first memory arrangement. The first data processing system is configured to establish, in response to input of a second version of the third object, the second version of the third object at a second memory location in the first memory arrangement that is different from the first location, and update in the first version of the data set, the pointer associated with the third object to reference the second location.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

The various embodiments of the invention provide a method and apparatus for replicating an object model on multiple systems. Globally unique identifiers (GUIDS) are used as object attributes for establishing associations between objects, which allows updates to an object to be propagated to other instances of the object model without also transmitting objects that have not been updated. In associating a first object with a second object (the first object references the second object), the first object includes two GUID values. The first GUID value identifies the first object, and the second GUID value identifies the second object, which is the referenced object. The second object includes at least one GUID attribute, the GUID that identifies the second object. If the second object references the first object or any other object, the second object also includes the GUID(s) of that referenced object.

The set of GUIDs for all objects in the object model are associated with pointers to the respective memory locations of the objects. Each instance of the object model includes the set of GUIDs, with the associated pointers being different among the instances since the instances of the object model will occupy different memory space on different systems. When an update to an object is input, an updated version of the object is stored in the memory, and the pointer to the prior version is changed to reference the updated version. The old version may be marked obsolete, or the application may, for each access to the object model, refer to the set of GUIDs and associated pointers to obtain the latest versions of objects.

Figure 1:
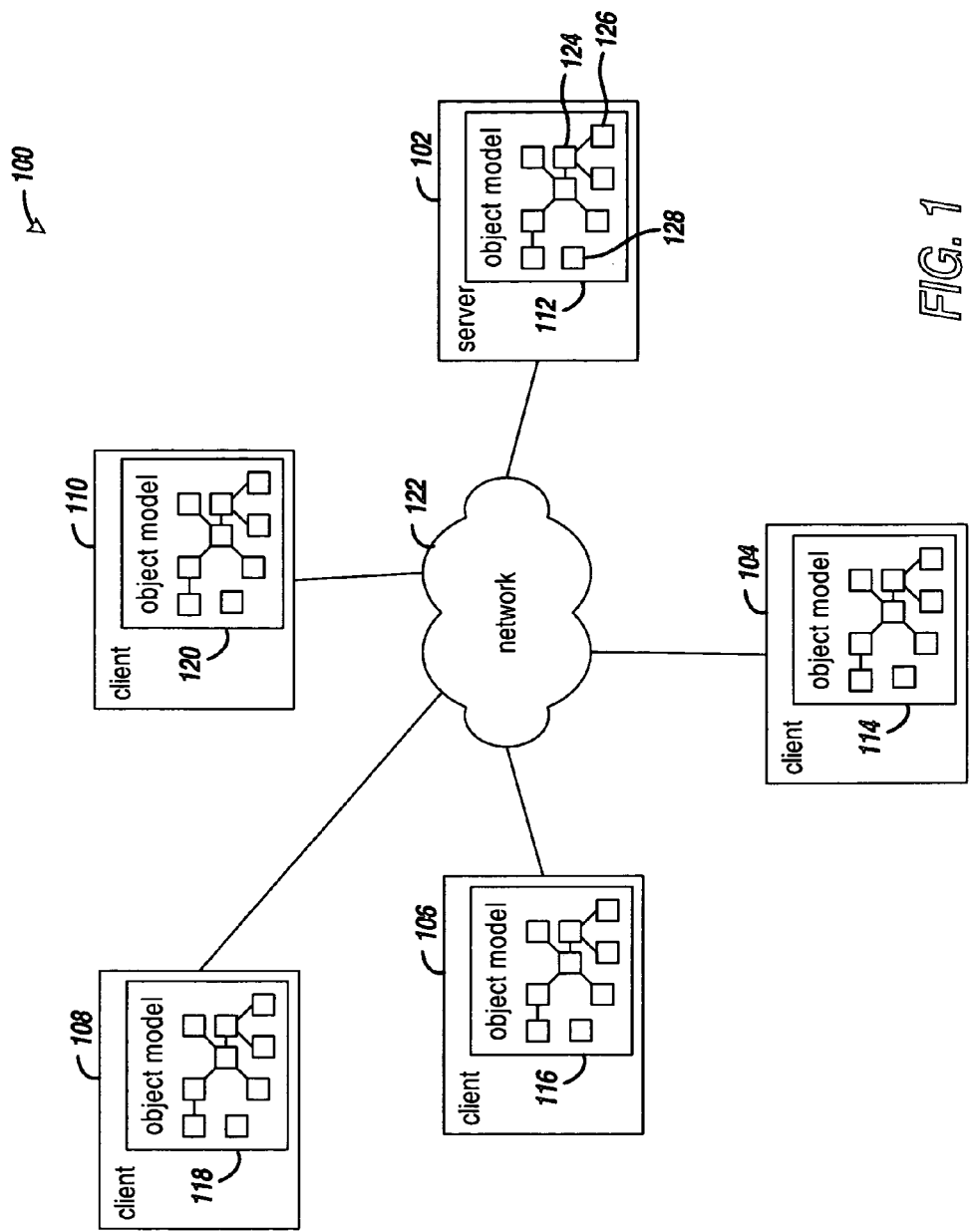
FIG. 1 is a block diagram of an example computing arrangement in which an object model is replicated across multiple systems.

FIG. 1 is a block diagram of an example computing arrangement 100 in which an object model is replicated across multiple systems. The server system 102 and each of the client systems 104, 106, 108, and 110 represent a data processing system configured with software that maintains an instance of the illustrated object model in cooperation with the systems having other instances of the object model. The instances of the object model are shown as blocks 112, 114, 116, 118, and 120. In an example embodiment, the server and clients are coupled to a network 122, the type of which is implementation dependent. The hardware may be any architecture and configuration suitable for the particular application. The software may include the application software along with software for data modeling and Web service communication such as the .NET framework from Microsoft.

The objects in the object model are shown as small blocks, for example blocks 124 and 126. The object model may include objects that are associated with other objects, as illustrated by the lines that connect the objects. Depending on the application, some objects, for example, object 128, may not be associated with any particular one of the other objects in the object model.

In an example embodiment, globally unique identifiers (GUIDs) are used to reference and associate one object with another. Each object includes an attribute that is the GUID value for that object. In addition, each object that is associated with another object has an attribute whose value is the GUID of the associated object. In this description, the GUID attribute in an object that identifies that object is referred to as the "object GUID," and the GUID attribute in an object that references an associated object is referred to as the "referenced GUID."

A set containing the GUIDs of all the objects in the object model is maintained at each of the server 102 and the clients 104, 106, 108, and 110. Each of the GUIDs in the set is associated with a pointer (memory address) to the object identified by the GUID.

When an update is made to an instance of the object model, such as the addition of an object that is associated with another object in the object model, the server transmits information to each of the clients for updating the instances of the object model. The information includes the attributes of the new/updated object, which include the object GUID and the referenced GUID(s) of any associated objects. In response to receiving an update to the object model, a client writes the object and new attribute values to its memory and updates the pointer associated with the object GUID to reference the newly stored object.

Since the application software on the client may still have pointers to the old version of the object, the client must indicate that the prior version of the object should not be used. In one embodiment, the old object may be marked as obsolete, and when attributes of the object are accessed the accessor first checks whether the object is obsolete. If so, the accessor looks up the object GUID in the set to find the pointer to the new version of the object. Alternatively, each access to an object may first lookup the pointer to the object so that the most recent version is always accessed.

By including a referenced GUID in an object for an associated object instead of a pointer to the associated object, the server does not need to send to the client further information for re-establishing the link to the associated object. With the referenced GUID in the updated object the client can establish the proper pointers without needing an exhaustive set of objects and relationships from the server. For example, if the updated object had a pointer to an associated object (and not a referenced GUID), the client would need some further information to link to the proper associated object since the instance of the referenced object on the server would likely be placed at a different memory address from the instance of the object on the client. Furthermore, a chain of associated objects would necessitate transmission of still further object model information from the server to the clients.

Figure 2:
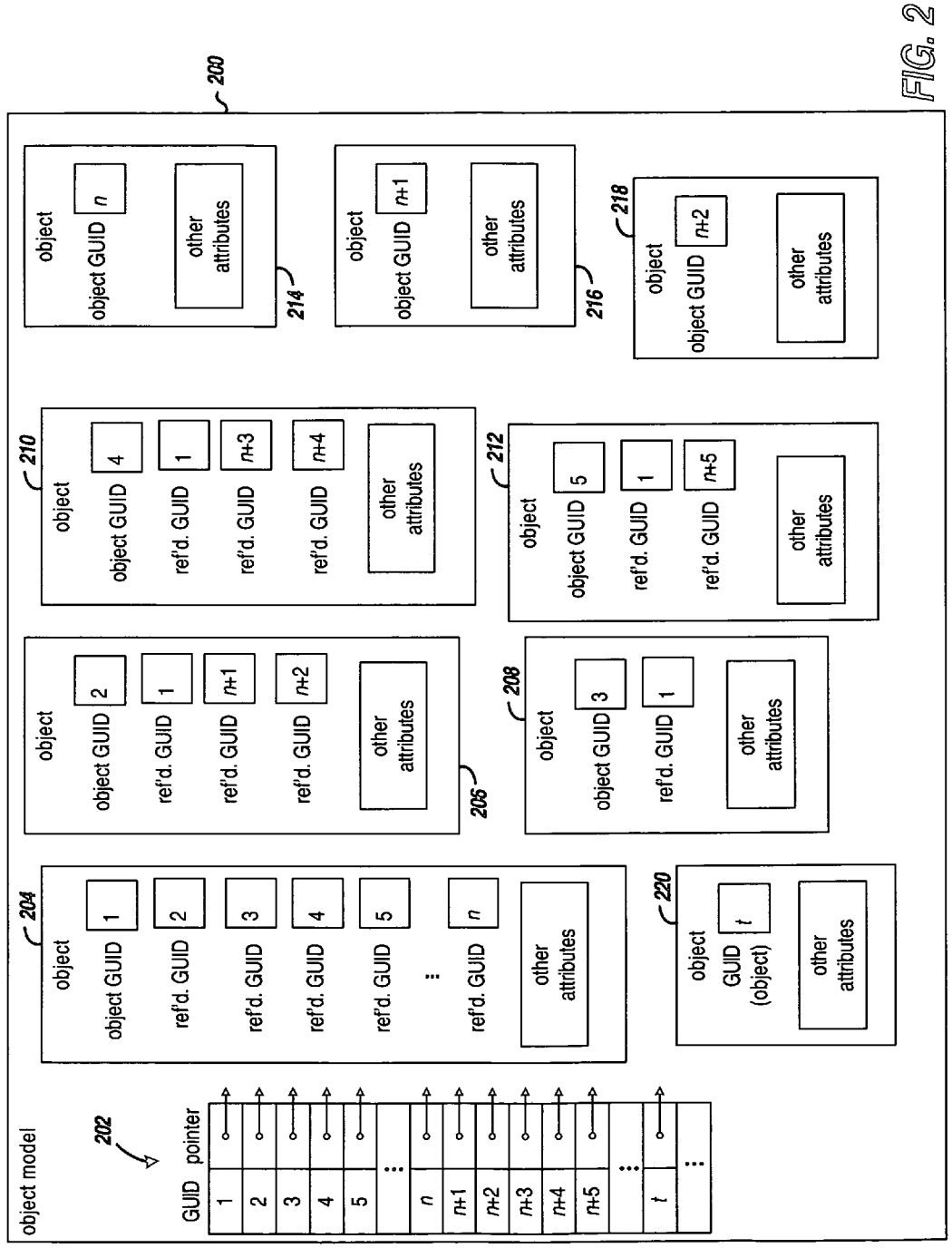
FIG. 2 is a block diagram of an example partial object model in accordance with one or more embodiments of the invention.

FIG. 2 is a block diagram of an example partial object model 200 in accordance with one or more embodiments of the invention. A GUID table 202 contains GUIDs of the objects and pointers to memory locations at which the object are stored. Each GUID value is associated with a pointer value, and the example table shows GUID values 1-5, n–n+5, and t and corresponding pointers to the illustrated objects shown as blocks 204, 206, 208, 210, 212, 214, 216, 218, and 220. For example, GUID value 1 has a pointer that is the memory address of the object shown by block 204. Those skilled in the art will recognize various alternative data structures that may be suitable for implementing the GUID table depending on application and implementation requirements.

Each object contains an "object GUID" attribute that is its own GUID value. For objects that are associated with other objects, a "referenced GUID" is included for each associated object. For example the object of block 204 has the object GUID 1 and referenced GUIDs 2, 3, 4, 5, . . . , and n. The referenced GUIDs are the GUIDs of the objects shown as blocks 206, 208, 210, 212, and 214. The objects in the object model may have other attributes that are application dependent.

Depending on the application, different objects may have different numbers of associated objects. For example, some objects may not be associated with any other object, and other objects may be associated with multiple other objects. The example object of block 220 is not associated with any of the other objects, and therefore, does not have a referenced GUID attribute. The object of block 206, on the other hand, is associated with objects with GUIDs 1, n+1, and n+2.

Depending on the application, two-way associations between objects may be useful. For example, the object of block 204 is associated with the object having referenced GUID 5, and the object with GUID 5 (block 212) has a referenced GUID attribute of 1, which is the object of block 204.

Figure 3:
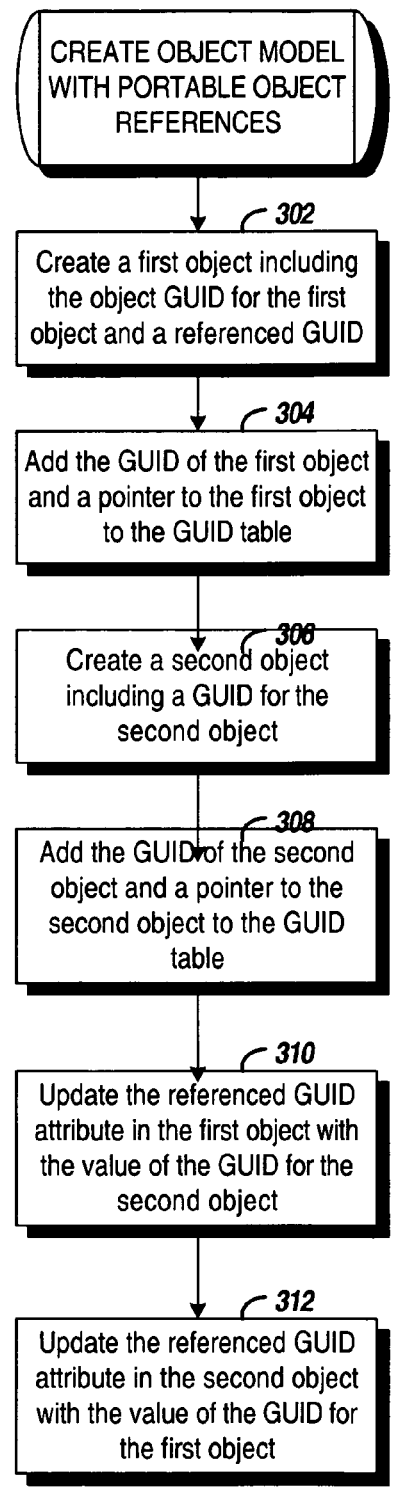
FIG. 3 is a flowchart of an example process for creating an object model with portable object references in accordance with one or more embodiments of the invention.

FIG. 3 is a flowchart of an example process for creating an object model with portable object references in accordance with one or more embodiments of the invention. The accompanying Appendix includes example source code that describes an example implementation that supports the methods described herein for creating and using portable object references.

At step 302, the process creates a first object that with at least attributes for the object GUID of the first object and a referenced GUID for use in referencing an associated object. The first object may further include application-specific attributes. At step 304, the GUID of the first object and a pointer to the first object are added to the GUID table 202. In an example implementation, the GUID table may be accessed prior to each access to an object.

A second object is creating at step 306, with the second object including at least the object GUID for the second object. Depending on the application, the second object may also include other application-specific attributes along with one or more referenced GUIDs to reference the first object or other objects in the object model.

At step 308, the GUID of the second object and the pointer to the object are added to the GUID table. The referenced GUID attribute in the first object is updated with the GUID value of the second object at step 310. If the second object includes a referenced GUID attribute for the first object (application dependent), then at step 312 the referenced GUID attribute in the second object is updated with the value of the GUID of the first object.

The example code in the Appendix further illustrates the creation of the first and second objects. The Main( ) program creates obj1 and obj2 as members of the DataObjectWithRef class. The GuidReference.AddObject statements add the GUIDs of obj1 and obj2 to the AllObjects sorted list, which is a collection in the GuidReference class.

The DataObjectWithRef class includes an Object attribute, which is a member of the DataObject class, for accessing the referenced data object and an Objectref attribute, which is a member of the GuidReference class. The private m_objectRef attribute is a member of GuidReference( ) and contains the referenced GUID as described above.

The Main( ) program makes the first object reference the second object with the statement:

obj1.Object=obj2;

In this statement, assigning obj2 to the Object attribute of obj1 results in the ID attribute of the private m_objectRef attribute to be set to the value of the ID attribute of obj2 (since obj1 is a DataObjectWithRef which has an Object attribute, which is a DataObject). After the statement is executed, the value of the Object attribute of obj1 is obj2. The ID property/attribute of DataObject class corresponds to the "object GUID" in FIG. 2. The "ref'd GUID" in FIG. 2 corresponds to the ID property/attribute of the GuidReference class. The ObjectRef property/attribute is not visible in FIG. 2, however, it relates to the "ref'd GUID" in FIG. 2 since it's value is an instance of the GuidReference class whose ID property/attribute is the "ref'd GUID". The Object property/attribute of the DataObjectWithRef class corresponds to the instance of the DataObject/DataObjectWithRef class that is being referenced. The Object property/attribute of the GuidReference class also corresponds to the instance of the DataObject/DataObjectWithRef class that is being referenced.

Figure 4:
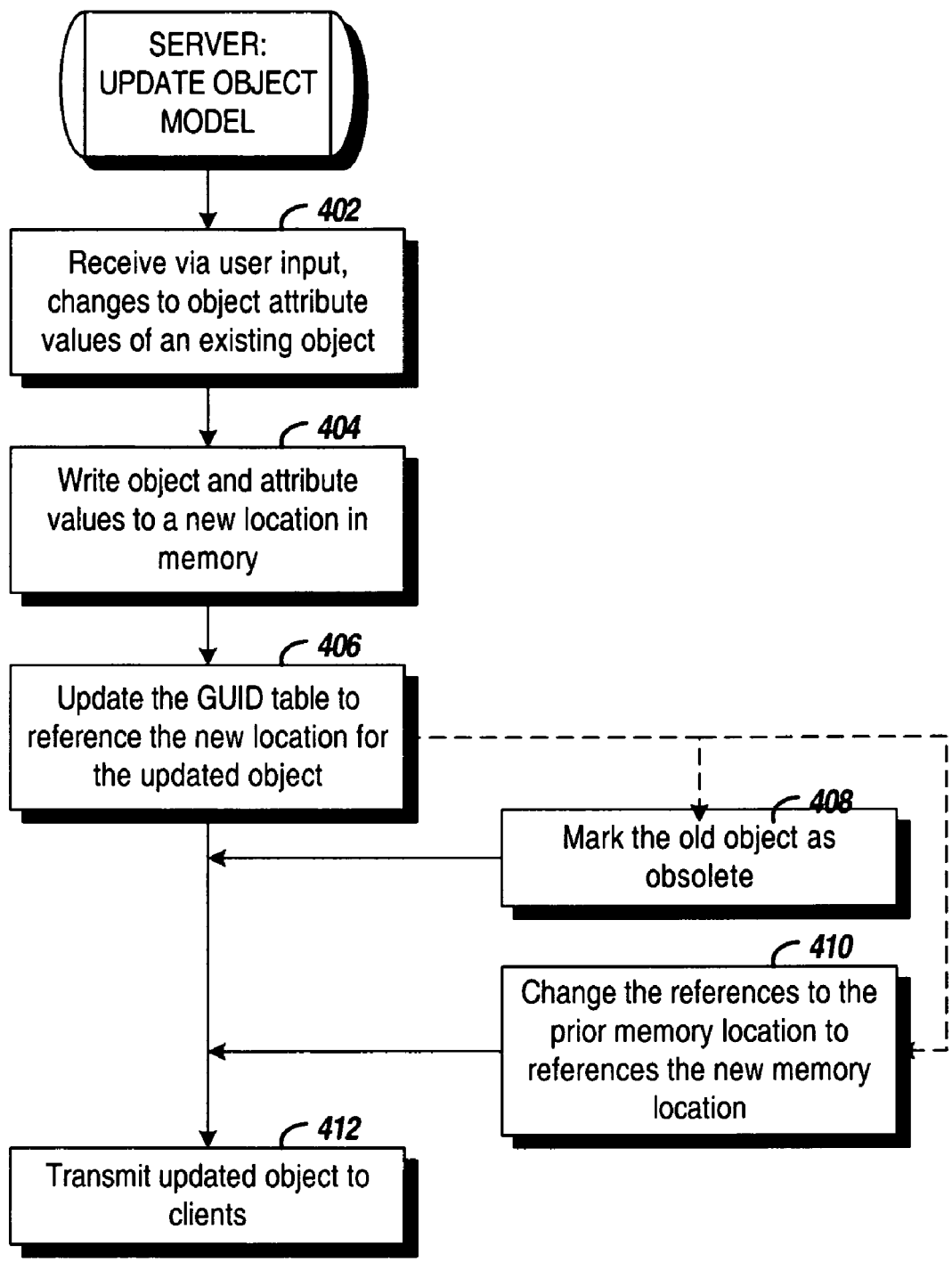
FIG. 4 is a flowchart of an example process for updating the object model in accordance with one or more embodiments of the invention.

FIG. 4 is a flowchart of an example process for updating the object model in accordance with one or more embodiments of the invention. At step 402, an updated object is received, for example as a result of user editing and input of object attribute values.

The process writes the object and its attributes values to a new location in memory at step 404. The new location is different from the location at which the previous version of the object is stored. The GUID table is updated at step 406 so that the pointer associated with the GUID for the updated object now references the new memory location.

Depending on implementation requirements, the process may or may not need to deal with pointers to the prior version of the object. In one embodiment, the prior version of the object may be marked obsolete, as shown by step 408, and with each access to objects in the object model, the accessor checks whether the object is obsolete before accessing an application attribute in the object. If the object is obsolete, the accessor finds the most recent object by way of the GUID table. In another embodiment, it may be feasible for the application to update all pointers to the old version of the object to reference the new version of the object as shown by step 410. In yet another embodiment, the GUID table may be accessed prior to each access to an object. The access to the GUID table obtains the pointer to the most recent version of the object with the desired GUID.

At step 412 the updated object is transmitted to each client having a replicated instance of the object model. In an example embodiment, the server prepares an XML specification of the updated object and transmits the XML object to each client. The get and set access methods in the DataObjectWithRef class are designated with XMLIgnore so that the attribute values of any objects referenced by one object are not serialized when the attribute values of that object are serialized for transmission. For example, if a first object includes a referenced GUID to a second object, and both the first and second objects have respective first and second sets of attributes, then when the first object is serialized, it is the first set of attributes of the first object that are serialized. The second set of attributes of the second object are not serialized. The referenced GUID approach allows the server to efficiently distribute an update to an individual object in the object model to the clients without having to also distribute other parts of the object model indicated by the referenced GUID.

While not shown, it will be recognized that each client receiving an updated object performs the processing of steps 404-410 as appropriate.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable media or delivery channels such as magnetic or optical disks or tapes, electronic storage devices, or as application services over a network.

The present invention is thought to be applicable to a variety of software systems. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

APPENDIX

```
// Copyright Unisys Corporation 2006
using System;
using System.Collections.Generic;
using System.Text;
using System.Xml.Serialization;
using System.Collections;
using System.IO;
namespace TestConsole
{
  class Program
  {
    // Main method to start application
    [STAThread]
    static void Main( )
    {
      // Create a data object and add to collection
      DataObject With Ref obj1 = new DataObjectWithRef( );
      GuidReference.AddObject( obj1 );
      // Create a second data object and add to collection
      DataObjectWithRef obj2 = new DataObjectWithRef( );
      GuidReference.AddObject( obj2 );
      // Make first object reference second.
      obj1.Object = obj2;
      // Set the value of an attribute of obj2 using obj1.
      ( (DataObjectWithRef)obj1.Object ).Property1 = 12;
      // Serialize obj1 by writing it to file 'C:\temp.txt'.
      TextWriter writer = new StreamWriter( @"C:\temp.txt" );
      XmlSerializer xs = new
      XmlSerializer( typeof( DataObjectWithRef ));
      xs.Serialize( writer, obj1 );
    }
  }
  public class DataObject
  {
    // Object identifier.
    public Guid ID = Guid.NewGuid( );
  }
  public class GuidReference
  {
    // Collection of all DataObjects.
    static private SortedList AllObjects = new SortedList( );
```

APPENDIX-continued

```
    // Identifier of referenced object.
    public Guid ID;
    // Property to get the referenced object. Does not get serialized.
    [XmlIgnore]
    public DataObject Object
    {
      get
      {
        // Obtain referenced object from list.
        return (DataObject)AllObjects[ID];
      }
      set
      {
        // Set the ID.
        if( value == null )
        {
          ID = Guid.Empty;
        }
        else
        {
          ID = value.ID;
        }
      }
    }
  }
  // Add object to list. Replaces existing object if found.
  static public void AddObject( DataObject obj )
  {
    lock( AllObjects )
    {
      AllObjects.Add( obj.ID, obj );
    }
  }
  // Remove object from list.
  static public void RemoveObject( DataObject obj )
  {
    lock( AllObjects )
    {
      AllObjects.Remove( obj.ID );
    }
  }
}
public class DataObjectWithRef : DataObject
{
  // Property accessing the referenced data object. This is
  // not XML serialized.
  [XmlIgnore]
  public DataObject Object
  {
    get
    {
      return m__objectRef.Object;
    }
    set
    {
      m__objectRef.Object = value;
    }
  }
  // Property accessing the GuidReference.
  public GuidReference ObjectRef
  {
    get
    {
      return m__objectRef;
    }
    set
    {
      m__objectRef = value;
    }
  }
  // Extended reference containing the DataObject identifier.
  private GuidReference m__objectRef = new GuidReference( );
  // Non-DataObject property.
  public int Property1
  {
    get
    {
      return m__property1;
    }
    set
```

APPENDIX-continued

```
    {
        m_property1 = value;
    }
}
// Private member for value of Property1.
private int m_property1 = 0;
    }
}
CODE OUTPUT: C:\Temp.txt
<?xml version="1.0" encoding="utf-8"?>
<DataObjectWithRef
xmlns:xsi="http://www.w3.org/2001/XMLSchema-instance"
xmlns:xsd="http://www.w3.org/2001/XMLSchema">
    <ID>ed06d904-ed5b-4552-b0ec-9379d1ed5ec5</ID>
    <ObjectRef>
        <ID>61aa3179-8951-4a79-98c1-cfcfbfcc714a</ID>
    </ObjectRef>
    <Property1>12</Property1>
</DataObjectWithRef>
```

What is claimed is:

1. A processor-implemented method for managing a plurality of instances of an object model, comprising:

establishing at least a first and a second instance of the object model in first and second memory arrangements of first and second data processing systems, respectively, each instance including a plurality of objects, wherein each object includes a first attribute that is a globally unique identifier (GUID) that identifies the object, a plurality of objects are associated with other objects of the plurality of objects, and for each association between a first and a second one of the plurality of objects, the first object includes a second attribute that is the GUID of the second object;

wherein the first and second instances of the object model are replicated instances;

establishing in the first memory arrangement a first version of a data set and establishing in the second memory arrangement a second version of the data set, each of the first and second versions including a plurality of GUID-pointer pairs, wherein for each of the pairs the GUID in the pair is one of the GUIDs of the plurality of objects and the pointer in the pair is a pointer to a memory location, the pointers in the first version referencing locations in the first memory arrangement and the pointers in the second version referencing locations in the second memory arrangement;

wherein a first version of a third object of the plurality of objects is stored in a first memory location in the first memory arrangement; and in response to input of a second version of the third object, establishing the second version of the third object at a second memory location in the first memory arrangement that is different from the first location, and updating in the first version of the data set, the pointer of the GUID-pointer pair having the GUID that identifies the third object, to reference the second location.

2. The method of claim 1, further comprising:

transmitting the second version of the third object to the second data processing system, wherein the first version of the third object is stored in a third memory location in the second memory arrangement; and in response to receipt of the second version of the third object at the second data processing system, establishing the second version of the third object at a fourth memory location in the second memory arrangement that is different from the third location, and updating in the second version of the data set, the pointer associated with the third object to reference the fourth location.

3. The method of claim 2, further comprising:

wherein the third object is associated with a fourth object and the third object includes as the second attribute the GUID of the fourth object;

in response to input of the second version of the third object, serializing attribute data of the second version of the third object;

bypassing serialization of attributes values of the fourth object that is associated with the third object; and transmitting the serialized attribute data to the second data processing system.

4. The method of claim 3, further comprising:

after updating in the first version of the data set the pointer corresponding to the third object, marking the first version of the third object obsolete; and in response to access to an attribute of the third object and the third object being marked obsolete, looking up in the first version of the data set the pointer associated with the third object in the second location, and accessing the third object in the second location.

5. The method of claim 3, wherein the attribute values of an object are serialized and formatted in a markup language.

6. The method of claim 5, further comprising:

accessing on the first data processing system the first version of the data set to obtain a pointer to a most recent version of an object prior to each access to an object; and accessing on the second data processing system the second version of the data set to obtain a pointer to a most recent version of an object prior to each access to an object.

7. The method of claim 5, further comprising:

after updating in the first version of the data set the pointer corresponding to the third object, marking the first version of the third object obsolete; and in response to access to an attribute of the third object and the third object being marked obsolete, looking up in the first version of the data set the pointer associated with the third object in the second location, and accessing the third object in the second location.

8. The method of claim 1, further comprising:

accessing on the first data processing system the first version of the data set to obtain a pointer to a most recent version of an object prior to each access to an object; and accessing on the second data processing system the second version of the data set to obtain a pointer to a most recent version of an object prior to each access to an object.

9. An apparatus for managing a plurality of instances of an object model, comprising:

means for establishing at least a first and a second instance of the object model in first and second memory arrangements of first and second data processing systems, respectively, each instance including a plurality of objects, wherein each object includes a first attribute that is a globally unique identifier (GUID) that identifies the object, a plurality of objects are associated with other objects of the plurality of objects, and for each association between a first and a second one of the plurality of objects, the first object includes a second attribute that is the GUID of the second object;

wherein the first and second instances of the object model are replicated instances;

means for establishing in the first memory arrangement a first version of a data set and for establishing in the second memory arrangement a second version of the data set, each of the first and second versions including a plurality of GUID-pointer pairs, wherein for each of the pairs the GUID in the pair is one of the GUIDs of the plurality of objects and the pointer in the pair is a pointer to a memory location, the pointers in the first version referencing locations in the first memory arrangement and the pointers in the second version referencing locations in the second memory arrangement;

wherein a first version of a third object of the plurality of objects is stored in a first memory location in the first memory arrangement; and means, responsive to input of a second version of the third object, for establishing the second version of the third object at a second memory location in the first memory arrangement that is different from the first location, and updating in the first version of the data set, the pointer of the GUID-pointer pair having the GUID that identifies the third object to reference the second location.

10. A system for managing an object model, comprising:

a plurality of data processing systems including respective processors coupled via a network, each having a stored instance of the object model, including at least a first and a second instance of the object model in first and second memory arrangements of first and second data processing systems, respectively, wherein each instance includes a plurality of objects, each object includes a first attribute that is a globally unique identifier (GUID) that identifies the object, a plurality of objects are associated with other objects of the plurality of objects, and for each association between a first and a second one of the plurality of objects, the first object includes a second attribute that is the GUID of the second object;

wherein the first and second instances of the object model are replicated instances;

wherein the first and second instances of the object model further include first and second versions of a data set, each of the first and second versions including a plurality of GUID-pointer pairs, wherein for each of the pairs the GUID in the pair is one of the GUIDs of the plurality of objects and the pointer in the pair is a pointer to a memory location, the pointers in the first version referencing locations in the first memory arrangement and the pointers in the second version referencing locations in the second memory arrangement; and wherein the first data processing system is configured to establish, in response to input of a second version of the third object, the second version of the third object at a second memory location in the first memory arrangement that is different from the first location, and update in the first version of the data set, the pointer of the GUID-pointer pair having the GUID that identifies the third object to reference the second location.

11. The system of claim 10, wherein:

the first data processing system is configured to transmit the second version of the third object to the second data processing system, wherein the first version of the third object is stored in a third memory location in the second memory arrangement; and the second data processing system is configured to establish, in response to receipt of the second version of the third object, the second version of the third object at a fourth memory location in the second memory arrangement that is different from the third location, and updating in the second version of the data set, the pointer associated with the third object to reference the fourth location.

12. The system of claim 11, wherein:

the third object is associated with a fourth object and the third object includes as the second attribute the GUID of the fourth object; and the first data processing system is configured to serialize, in response to input of the second version of the third object, attribute data of the second version of the third object, bypass serialization of attributes values of the fourth object that is associated with the third object, and transmitting the serialized attribute data to the second data processing system.

13. The system of claim 12, wherein the first data processing system is further configured to:

mark the first version of the third object obsolete after update in the first version of the data set the pointer corresponding to the third object; and in response to access to an attribute of the third object and the third object being marked obsolete, look up in the first version of the data set the pointer associated with the third object in the second location, and access the third object in the second location.

14. The system of claim 12, wherein the attribute values of an object are serialized and formatted in a markup language.

15. The system of claim 14, wherein the first data processing system is further configured to access the first version of the data set to obtain a pointer to a most recent version of an object prior to each access to an object, and the second data processing is further configured to access the second version of the data set to obtain a pointer to a most recent version of an object prior to each access to an object.

16. The system of claim 14, wherein the first data processing system is further configured to:

mark the first version of the third object obsolete after update in the first version of the data set the pointer corresponding to the third object; and in response to access to an attribute of the third object and the third object being marked obsolete, look up in the first version of the data set the pointer associated with the third object in the second location, and access the third object in the second location.

17. The system of claim 10, wherein the first data processing system is further configured to access the first version of the data set to obtain a pointer to a most recent version of an object prior to each access to an object, and the second data processing is further configured to access the second version of the data set to obtain a pointer to a most recent version of an object prior to each access to an object.

* * * * *